US009741360B1

(12) United States Patent
Li et al.

(10) Patent No.: US 9,741,360 B1
(45) Date of Patent: Aug. 22, 2017

(54) SPEECH ENHANCEMENT FOR TARGET SPEAKERS

(71) Applicant: Spectimbre Inc., San Jose, CA (US)

(72) Inventors: Xi-Lin Li, San Jose, CA (US); Yan-Chen Lu, Campbell, CA (US)

(73) Assignee: Spectimbre Inc., San Jose, CA (US)

( * ) Notice: Subject to any disclaimer, the term of this patent is extended or adjusted under 35 U.S.C. 154(b) by 0 days.

(21) Appl. No.: 15/289,181

(22) Filed: Oct. 9, 2016

(51) Int. Cl.

| | |
|---|---|
| ***G10L 21/0272*** | (2013.01) |
| ***G10L 21/028*** | (2013.01) |
| ***G10L 21/0308*** | (2013.01) |
| ***G10L 21/0232*** | (2013.01) |
| ***G10L 15/02*** | (2006.01) |
| ***G10L 25/51*** | (2013.01) |
| ***G10L 15/14*** | (2006.01) |
| ***G10L 25/21*** | (2013.01) |

(52) U.S. Cl.
CPC .......... *G10L 21/0232* (2013.01); *G10L 15/02* (2013.01); *G10L 15/14* (2013.01); *G10L 21/028* (2013.01); *G10L 21/0272* (2013.01); *G10L 25/21* (2013.01); *G10L 25/51* (2013.01); *G10L 21/0308* (2013.01)

(58) Field of Classification Search
CPC ............... G10L 21/0272; G10L 21/028; G10L 21/0308; G10L 21/0208; G10L 21/02
USPC .................................. 704/226, 233, E21.002
See application file for complete search history.

(56) References Cited

U.S. PATENT DOCUMENTS 8,194,900 B2 6/2012 Fischer et al.
8,249,867 B2 8/2012 Cho et al.
8,874,439 B2 10/2014 Kim et al.
9,257,120 B1 2/2016 Alvarez Guevara et al.
2005/0228673 A1* 10/2005 Nefian .................... G10L 15/25 704/270
2010/0098266 A1* 4/2010 Mukund ............. G10L 21/0272 381/94.7

(Continued)

OTHER PUBLICATIONS

Koldovský, Zbyněk, et al. "Time-domain blind audio source separation method producing separating filters of generalized feedforward structure." International Conference on Latent Variable Analysis and Signal Separation. Springer Berlin Heidelberg, Sep. 2010, pp. 17-24.*

(Continued)

*Primary Examiner* — James Wozniak
(74) *Attorney, Agent, or Firm* — patenttm.us

(57) ABSTRACT

A method of speech enhancement for target speakers is presented. A blind source separation (BSS) module is used to separate a plurality of microphone recorded audio mixtures into statistically independent audio components. At least one of a plurality of speaker profiles are used to score and weight each audio components, and a speech mixer is used to first mix the weighted audio components, then align the mixed signals, and finally add the aligned signals to generate an extracted speech signal. Similarly, a noise mixer is used to first weight the audio components, then mix the weighted signals, and finally add the mixed signals to generate an extracted noise signal. Post processing is used to further enhance the extracted speech signal with a Wiener filtering or spectral subtraction procedure by subtracting the shaped power spectrum of extracted noise signal from that of the extracted speech signal.

17 Claims, 7 Drawing Sheets

(56) References Cited

U.S. PATENT DOCUMENTS

| | | | | |
|---|---|---|---|---|
| 2013/0275128 A1* | 10/2013 | Claussen | G10L 15/20 | |
| | | | 704/233 | |
| 2015/0139433 A1* | 5/2015 | Funakoshi | H04R 3/04 | |
| | | | 381/71.1 | |

OTHER PUBLICATIONS

Koldovsky, Zbynek. "Blind Separation of Multichannel Signals by Independent Components Analysis." Faculty of Mechatronics, Informatics and Interdisciplinary Studies, Technical University of LiberecThesis. Nov. 2010, pp. 1-129.*

Málek, Jiře, et al. "Adaptive time-domain blind separation of speech signals." International Conference on Latent Variable Analysis and Signal Separation. Springer Berlin Heidelberg, Jan. 2010, pp. 9-16.*

Málek, Jiři, et al. "Fuzzy clustering of independent components within time-domain blind audio source separation method." Electronics, Control, Measurement and Signals (ECMS), 2011 10th International Workshop on. IEEE, Jun. 2011, pp. 44-49.*

Odani, Kyohei. "Speech Recognition by Dereverberation Method Based on Multi-channel LMS Algorithm in Noisy Reverberant Environment." 2011, pp. 1-20.*

Wang, Longbiao, et al. "Speech recognition using blind source separation and dereverberation method for mixed sound of speech and music." Signal and Information Processing Association Annual Summit and Conference (APSIPA), 2013 Asia-Pacific. IEEE, Nov. 2013, pp. 1-4.*

Maina, C., J. M. Walsh, Joint speech enhancement and speaker identification using Monte Carlo methods, 2010 44th Annual Conference on Information Sciences and Systems (CISS), Mar. 2010, pp. 1-6, Princeton, NJ.

Ming, J., T. J. Hazen, J. R. Glass, Combining missing-feature theory, speech enhancement, and speaker-dependent/-independent modeling for speech separation, Computer Speech and Language, 2010, vol. 24, pp. 67-76.

Mowlaee, P., R. Saeidi, M. G. Christensen, Z.-H. Tan, T. Kinnunen, P. Franti, S. H. Jensen, A joint approach for single-channel speaker identification and speech separation, IEEE Transactions on Audio, Speech, and Language Processing, Jul. 2012, vol. 20, No. 9, pp. 2586-2601.

Scarpiniti, M., F. Garzia, Security monitoring based on joint automatic speaker recognition and blind source separation, 2014 International Carnahan Conference on Security Technology, Oct. 2014, pp. 1-6, Rome.

Yamada, T., A. Tawari, M. M. Trivedi, In-vehicle speaker recognition using independent vector analysis, 2012 15th International IEEE Conference on Intelligent Transportation Systems, Sep. 2012, pp. 1753-1758, Anchorage, AK.

Torkkola, K., Blind separation for audio signals—are we there yet? Proc. of ICA'99, 1999, pp. 239-244, Aussois.

Kim, T., T. Eltoft, T.-W. Lee, Independent vector analysis: an extension of ICA to multivariate components, Proc. Int. Conf. Independent Component Analysis and Blind Signal Separation, 2006, pp. 165-172.

Li, X.-L., T. Adali, M. Anderson, Joint blind source separation by generalized joint diagonalization of cumulant matrices, Oct. 2011, vol. 91, No. 10, pp. 2314-2322.

Reynolds, D. A., R. C. Rose, Robust text-independent speaker identification using Gaussian mixture speaker models, IEEE Transactions on Speech and Audio Processing, Jan. 1995, vol. 3, No. 1, pp. 72-83.

Reynolds, D. A., T. F. Quatieri, R. B. Dunn, Speaker verification using adapted Gaussian mixture models, Digital Signal Processing, Jan. 2000, vol. 10, No. 1-3, pp. 19-41.

Kinnunen, T., H. Li, An overview of text-independent speaker recognition: from features to supervectors, Speech Communication, Jan. 2010, vol. 52, No. 1, pp. 12-40.

Yin, S., C., R. Rose, P. Kenny, A joint factor analysis approach to progressive model adaptation in text-independent speaker verification, IEEE Transactions on Audio, Speech, and Language Processing, Sep. 2007, vol. 15, No. 7, pp. 1999-2010.

Azaria, M., R. Israel, H. Israel, D. Hertz, Time delay estimation by generalized cross correlation methods, IEEE Transactions on Acoustics, Speech, and Signal Processing, Apr. 1984, vol. 32, No. 2, pp. 280-285.

* cited by examiner

SPEECH ENHANCEMENT FOR TARGET SPEAKERS

BACKGROUND OF THE INVENTION

1. Field of the Invention

The invention relates to a method for digital speech signal enhancement using signal processing algorithms and acoustic models for target speakers. The invention further relates to speech enhancement using microphone array signal processing and speaker recognition.

2. Description of the Prior Arts

Speech/voice plays an important role in the interaction between human and human, and human and machine. However, the omnipresent environmental noise and interferences may significantly degrade the quality of captured speech signal by a microphone. Some applications, e.g. the automatic speech recognition (ASR) and speaker verification, are especially vulnerable to such environmental noise and interferences. A hearing impaired human also suffers from the degradation of speech quality. Although a person with normal hearing can tolerate considerable noise and interferences in the captured speech signal, listener fatigue easily arises with exposure to low signal to noise ratio (SNR) speech.

It is not uncommon to find more than one microphones on many devices, e.g. a smartphone, a tablet, or a laptop computer. An array of microphone can be used to boost the speech quality by means of beamforming, blind source separation (BSS), independent component analysis (ICA), and many other proper signal processing algorithms. However, there may be several speech sources in the acoustic environment where the microphone array is deployed, and these signal processing algorithms themselves cannot decide which source signal should be kept and which one should be suppressed along with the noise and interferences. Conventionally, a linear array is used, and sound wave of a desired source is assumed to impinge on the array either from the central direction, or from either end of the array, hence correspondingly, a broadside beamforming or an endfire beamforming is used to enhance the desired speech signal. Such a conventional way, at least to some extent, limits the utility of a microphone array. An alternative choice is to extract a speech signal from the audio mixtures recorded by microphone array that best matches a predefined speaker model or speaker profile. This solution is most attractive when the target speaker is predictable or known in advance. For example, the most likely target speaker of a personal device like a smartphone might be the device owner. Once a speaker profile for a device owner is created, the device can always focus on its owner's voice, and treats other voices as interferences, except when it is explicitly set not to behave in this way.

SUMMARY OF THE INVENTION

The present invention provides a speech enhancement method for at least one of a plurality of target speakers using blind source separation (BSS) of microphone array recordings and speaker recognition based on a list of predefined speaker profiles.

A BSS algorithm separates the recorded mixtures from a plurality of microphones into statistically independent audio components. For each audio component, at least one of a plurality of predefined target speaker models are used to evaluate its likelihood that it belongs to the target speakers. The source components are weighted and mixed to generate a single extracted speech signal that best matches the target speaker models. Post processing is used to further suppress noise and interferences in the extracted speech signal.

These and other features of the invention will be more readily understood upon consideration of the attached drawings and of the following detailed description of those drawings and the presently-preferred and other embodiments of the invention.

DETAILED DESCRIPTION OF THE EMBODIMENTS

Overview of the Present Invention

The present invention describes a speech enhancement method for at least one of a plurality of target speakers. At least two of a plurality of microphones are used to capture audio mixtures. A blind source separation (BSS) algorithm, or an independent component analysis (ICA) algorithm, is used to separate these audio mixtures into approximately statistically independent audio components. For each audio component, at least one of a plurality of predefined target speaker profiles is used to evaluate a probability or a likelihood suggesting that the selected audio component belongs to the considered target speakers. All audio components are weighted according to the above mentioned likelihoods and mixed together to generate a single extracted speech signal that best matches the target speaker models. In a similar way, for each audio component, at least one of a plurality of noise models, or the target speaker models in the absence of noise models, are used to evaluate a probability or a likelihood suggesting that the considered audio component is noise or does not contain any speech signal from target speakers. All audio components are weighted according to the above mentioned likelihoods and mixed to generate a single extracted noise signal. Using the extracted noise signal, a Wiener filtering or a spectral subtraction is used to further suppress the residual noise and interferences in the extracted speech signal.

Figure 1:
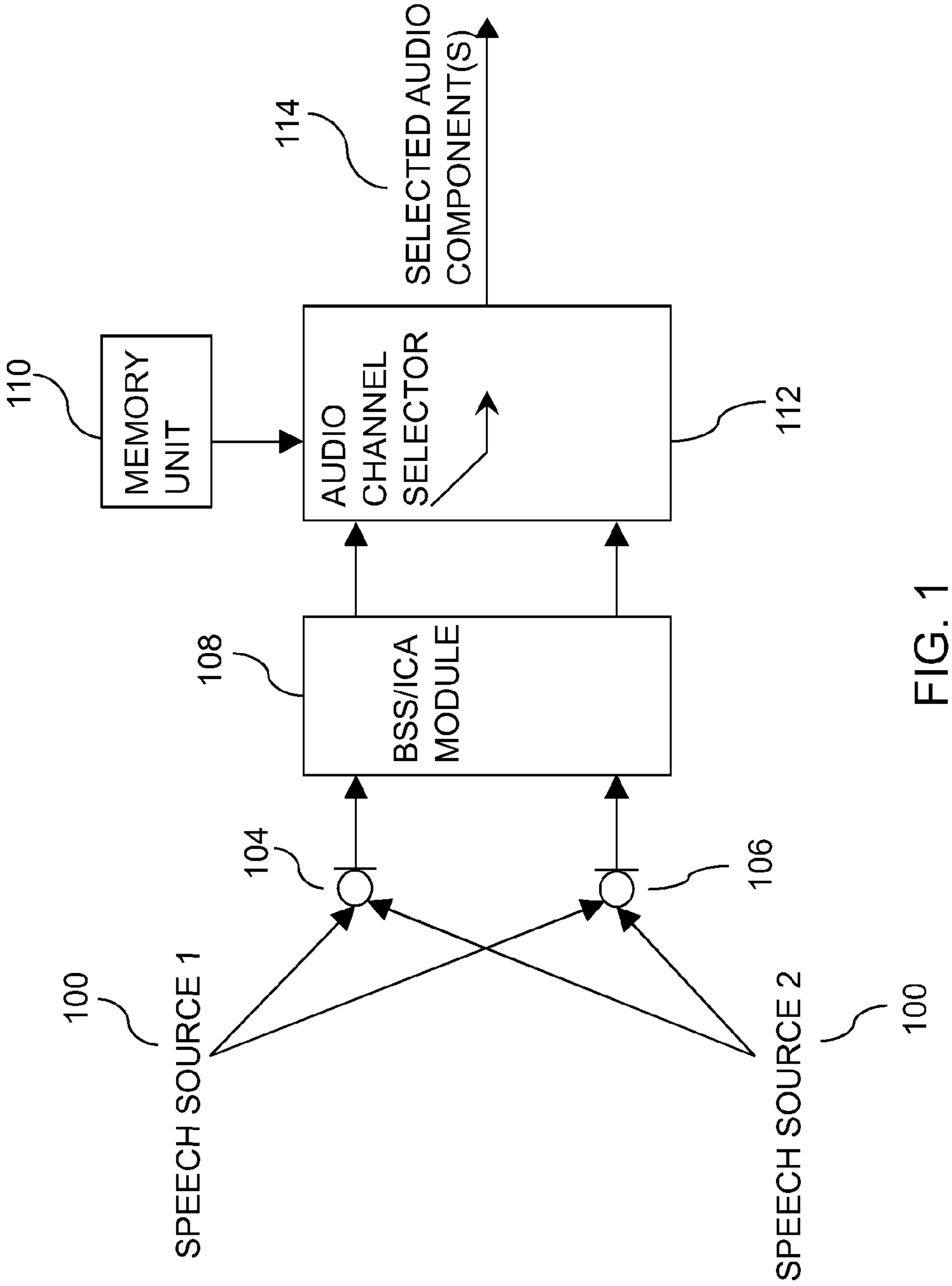
FIG. 1 PRIOR ART
FIG. 1 is a block diagram of a typical implementation of related prior arts.

FIG. 1 is a block diagram of related prior arts. Sound waves from two speech sources, 100 and 102, impinge on two recording devices, e.g. microphones 104 and 106. A BSS or ICA module 108 separates the audio mixtures into two source components. At least one of a plurality of speaker profiles are stored in a memory unit 110. An audio channel selector 112 selects one audio component that best matches the considered speaker profile(s), and outputs it as a selected speech signal 114. The prior arts work the best for static mixtures and an offline processing due to the use of a hard switching. For application scenarios where dynamic or time varying mixing conditions, and a dynamic or time varying online BSS implementation are involved, it is difficult or not possible to separate the audio mixtures into audio components such that only one audio component contains the desired speech signal. For example, during the transient stages of a BSS process, all these audio components may contain considerable desired speech signal, noise and interferences. Furthermore, the BSS outputs may switch channels such that at one time, the desired speech signal dominates in one channel, and at another time, the desired speech signal dominates another channel. Clearly, a hard switch as shown in FIG. 1 cannot properly handle these situations, and may generate seriously distorted speech signal. The present invention overcomes these difficulties by using a separation-and-remixing procedure to well keep the desired speech signal even in a dynamic audio environment, and a post-processing module to further enhance the desired speech signal.

Figure 2:
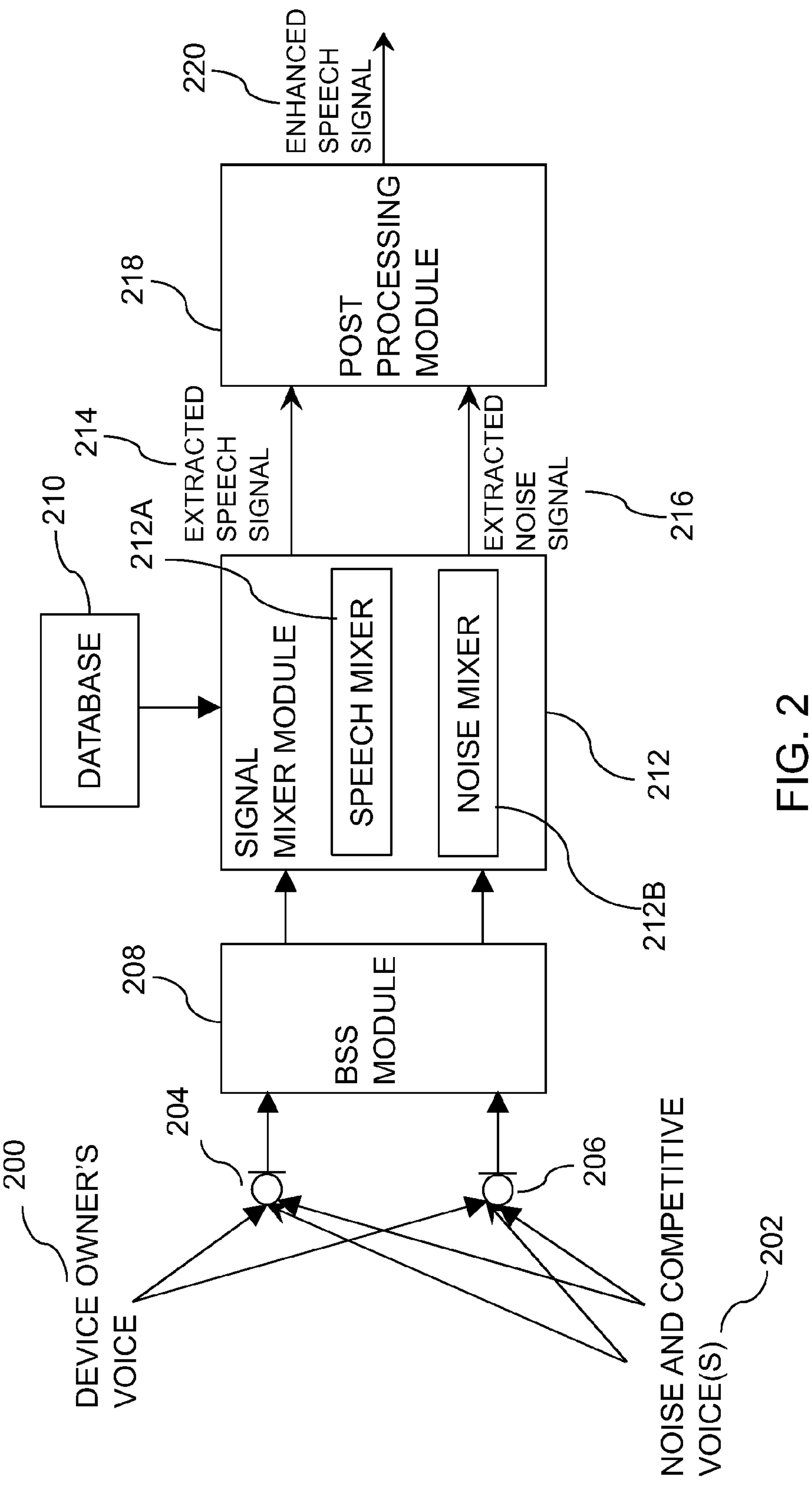
FIG. 2 is a block diagram of a representative embodiment of a system for speech enhancement in accordance with the present invention where two microphones are used.
Figure 5:
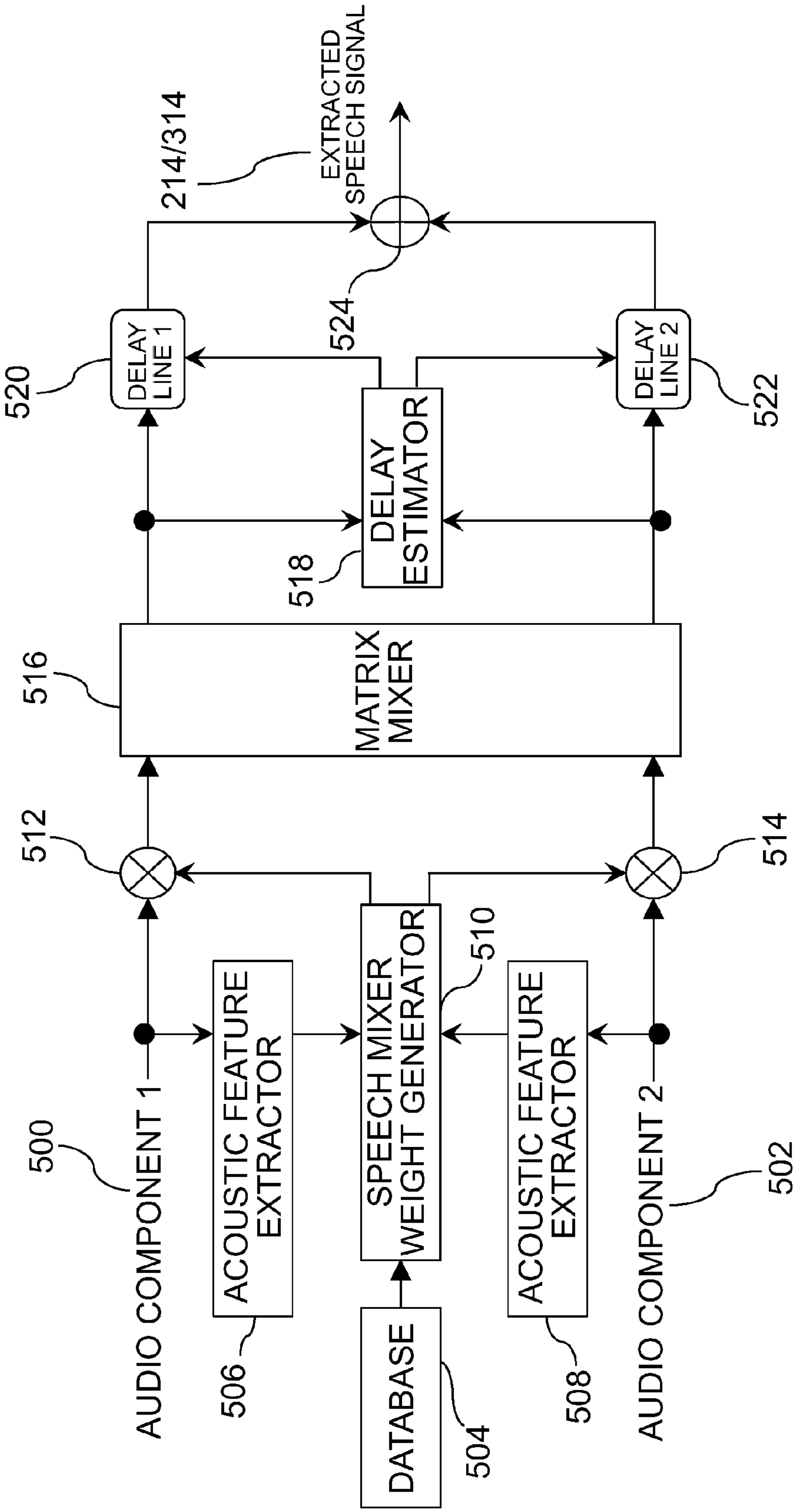
FIG. 5 is a block diagram illustrating the speech mixer of the system in FIGS. 2 and 3.
Figure 6:
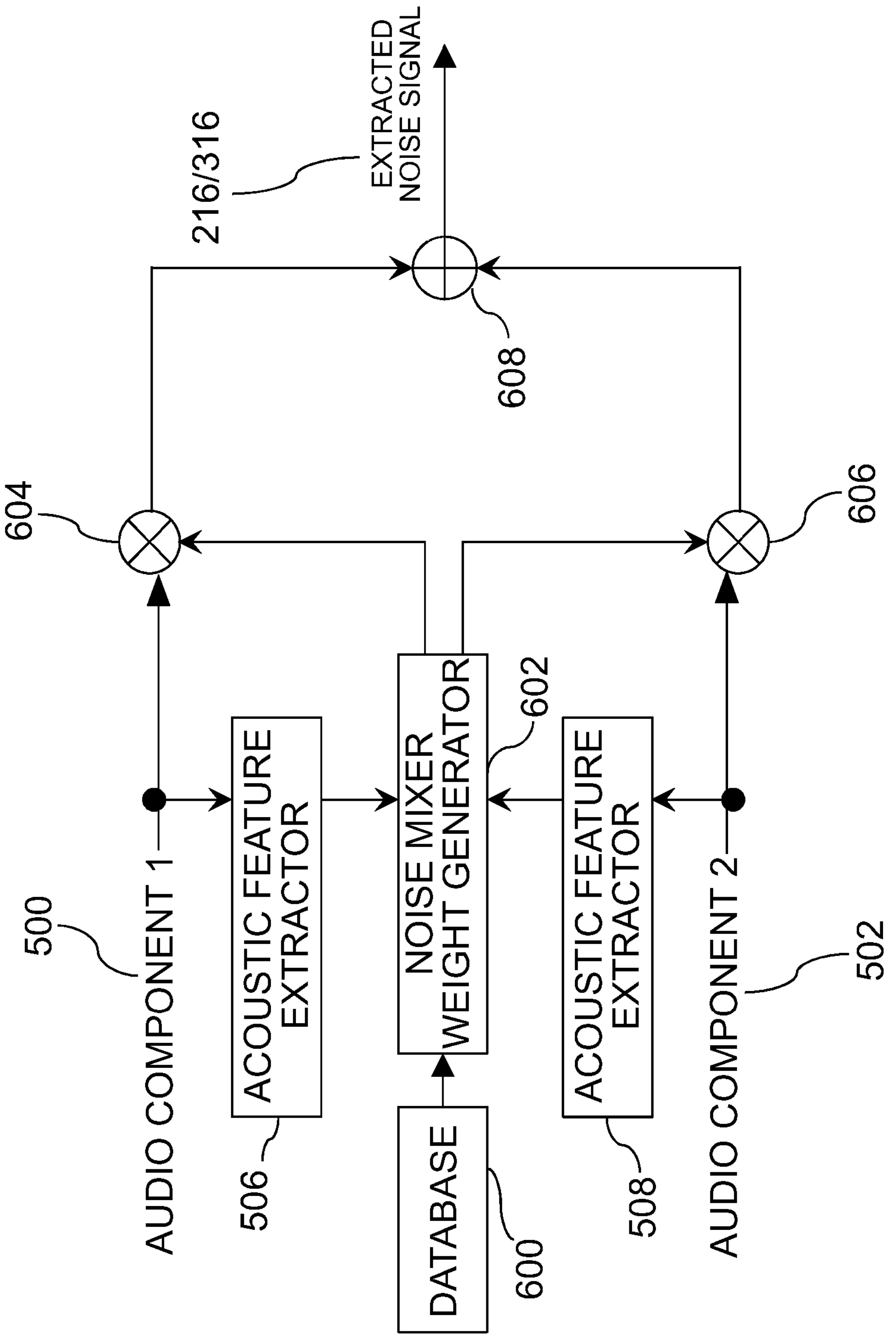
FIG. 6 is a block diagram illustrating the noise mixer of the system in FIGS. 2 and 3.

FIG. 2 is a block diagram of one embodiment of the present invention where a device owner's voice signal 200 is to be extracted, and competitive voices and noise 202 are to be suppressed. Here, the device can be a smartphone, a tablet, a personal computer, etc. . . . . Two recorded audio mixtures, 204 and 206, are fed into BSS module 208. The device owner's speaker profile is saved in a database 210. The speaker profile can be trained on the same device, or on another device and transferred to the considered device later. A signal mixer module 212 weights the separated audio components and mixes them properly to generate an extracted speech signal 214 and an extracted noise signal 216. Extracted speech signal 214 and extracted noise signal 216 are sent to a post processing module 218 to further suppress the residual noise and competitive voices in extracted speech signal 214 by a Wiener filtering or a spectral subtraction procedure to generate an enhanced speech signal 220. In one embodiment, the signal mixer module 212 further comprises a speech mixer 212A and a noise mixer 212B. Their detailed block diagrams are shown in FIG. 5 and FIG. 6, respectively.

Figure 3:
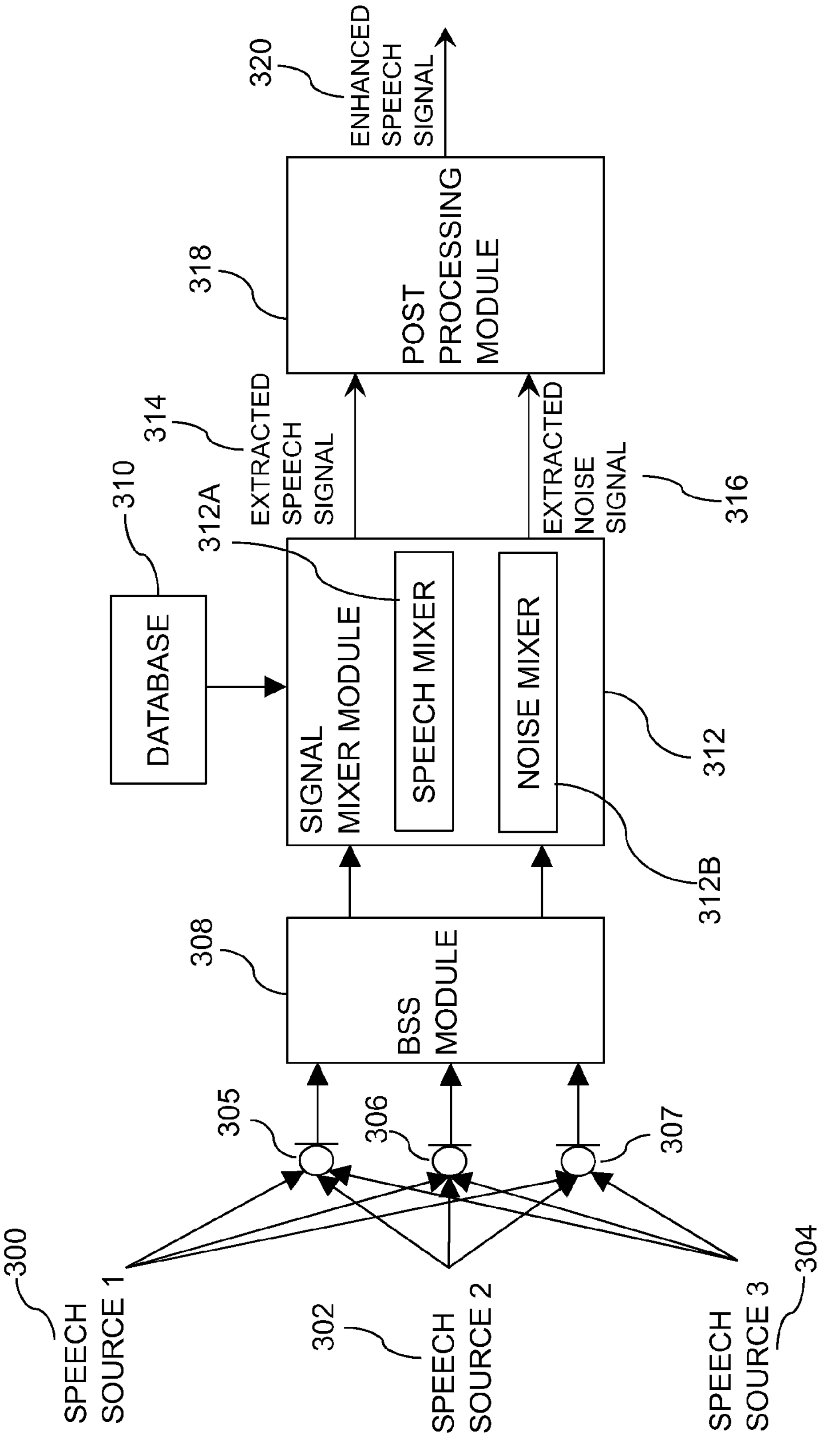
FIG. 3 is a block diagram of another embodiment of a system for speech enhancement in accordance with the present invention where multiple microphones and multiple sources are present.

FIG. 3 is a block diagram of another embodiment of the present invention where multiple speakers and multiple audio mixture recordings are considered. A typical example of this embodiment is speech enhancement for conference recordings where speech signals of a few key speakers are to be extracted and enhanced. In this example, three speakers, 300, 302 and 304, are present in the same recording space, and their speech signals may overlap in time. Three audio mixture recordings, e.g. audio signals recorded by microphones 305, 306 and 307, are fed into BSS module 308, and are to be separated into three audio components. A database 310 may save at least one of a plurality of speaker profiles. Using selected speaker profiles, a signal mixer module 312 generates extracted speech signal 314, and extracted noise signal 316. A post processing module 318 further enhances extracted speech signal 314 to generate enhanced speech signal 320.

Blind Source Separation

Figure 4:
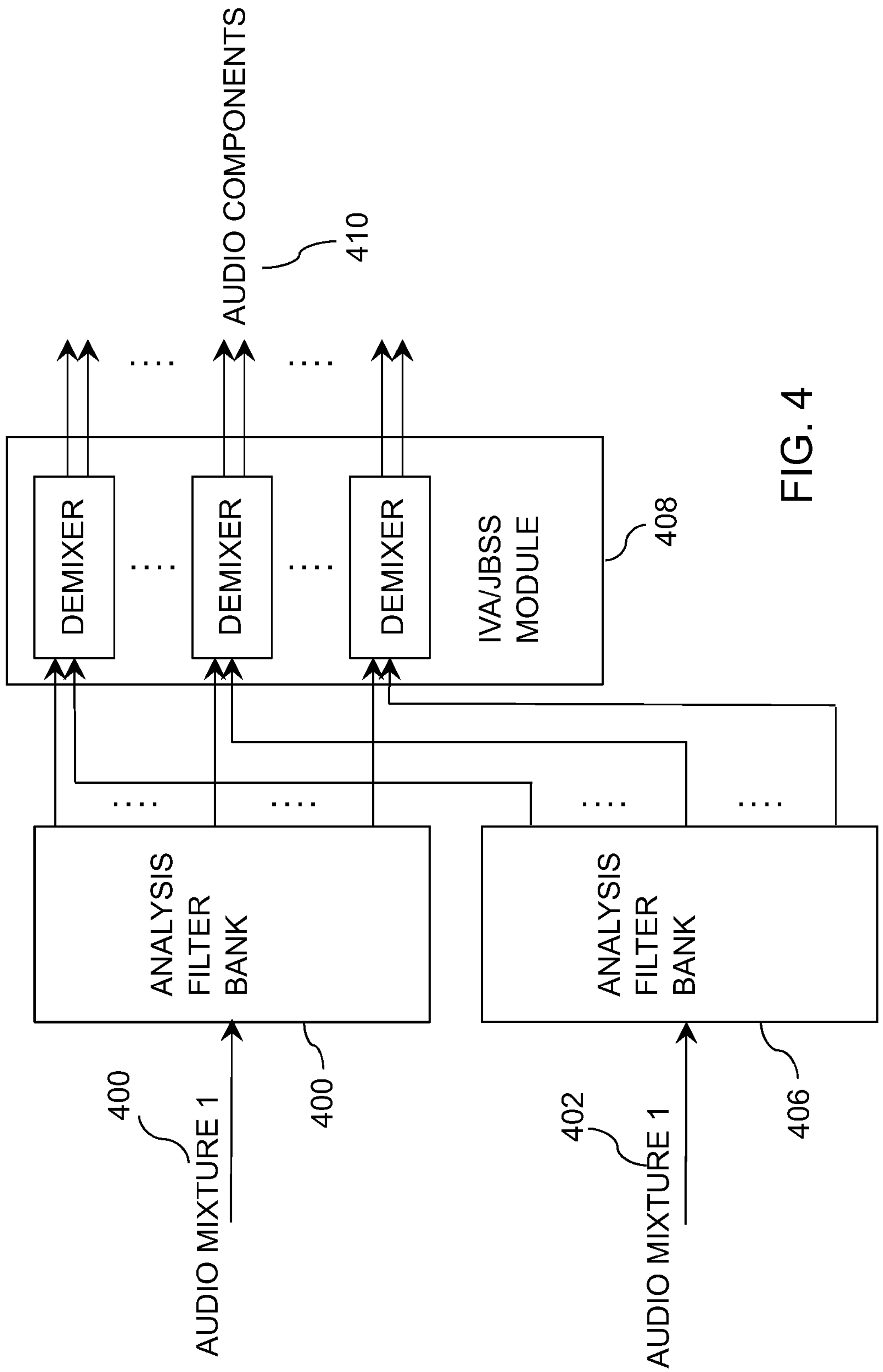
FIG. 4 demonstrates a frequency domain blind source separation module of the system in FIGS. 2 and 3.

FIG. 4 is a block diagram illustrating a preferred implementation of the BSS module 208, 308 shown in FIGS. 2 and 3. For the clarity of presentation, FIG. 4 is a block diagram illustrating a frequency domain BSS for the separation of two audio mixtures by means of independent vector analysis (IVA) or joint blind source separation (JBSS). However, it should not be understood that the present invention is limited to a BSS implementation in the frequency domain and limited to the separation of two audio mixtures. A BSS implementation in other domains, e.g. a subband domain, a wavelet domain, or even the original time domain, can be used as well. The number of audio mixtures to be separated can be two or any integer number no less than two. Any proper form of BSS implementation, e.g. IVA, JBSS, or a two stage BSS solution where in the first stage mixtures in each bin is independently separated by a BSS or an ICA solution, and in the second stage, the frequency bin permutation is solved using the direction-of-arrival (DOA) information and certain statistical properties of speech signals, e.g. similar amplitude envelopes across all bins from the same speech signal.

In FIG. 4, two analysis filter banks, 404 and 406, transform two audio mixtures, 400 and 402, into the frequency domain. The two analysis filter banks 404, 406 should have identical structure and parameters, and there should exist a synthesis filter bank paired with the analysis filter banks 404, 406 that can perfectly or approximately perfectly reconstructs the original time domain signal when the frequency signals are not altered. Examples of such analysis/synthesis filter banks are short-time Fourier transform (STFT) and discrete Fourier transform (DFT) modulated filter banks. For each frequency bin, an IVA or JBSS module 408 separates the two audio mixtures into two audio components with a demixing matrix. The frequency permutation problem is solved by exploiting the statistical dependency among bins from the same speech source signal, a feature of IVA and JBSS. These audio components 410 are sent to the signal mixer module 212, 312 for further processing.

In general, a plurality of analysis filter banks transform a plurality of time domain audio mixtures into a plurality of frequency domain audio mixtures, which can be written as:

$$x(n,t) \rightarrow X(n,k,m), \quad \text{(Equation 1)}$$

where x(n, t) is the time domain signal of the $n^{th}$ audio mixture at discrete time t, and X(n, k, m) is the frequency domain signal of the $n^{th}$ audio mixture, the $k^{th}$ frequency bin, and the $m^{th}$ frame or block. For each frequency bin, a vector is formed as X(k, m)=[X(1, k, m), X(2, k, m), . . . , X(N, k, m)], and for the $m^{th}$ block, a separation matrix W(k, m) is solved to separate these audio mixtures into audio components as $$[Y(1,k,m), Y(2,k,m), \ldots, Y(N,k,m)] = W(k,m)X(k,m), \quad \text{(Equation 2)}$$

where N is the number of audio mixtures. A stochastic gradient descent algorithm with a small enough step size is used to solve for W(k, m). Hence, W(k, m) evolves slowly with respect to its frame index m. Forming a frequency source vector as Y(n, m)=[Y(n, 1, m), Y(n, 2, m), . . . , Y(n, K, m)], the well known frequency permutation problem is solved by exploiting the statistical independency among different source vectors and the statistical dependency among the components from the same source vector, thus the name of IVA. Scaling ambiguity is another well known issue of a BSS implementation. One convention to remove this ambiguity is to scale the separation matrix in each bin such that all its diagonal elements have unit amplitude and zero phase.

Speech Mixer

FIG. 5 is a diagram illustrating the speech mixer 212A, 312A combining two audio components into a single extracted speech signal. However, it should not be understood that the present speech mixer 212A, 312A only works for mixing two audio components, although for the clarity of presentation, only the simplest case, mixing of two audio components, is demonstrated in FIG. 5.

In FIG. 5, two identical acoustic feature extractors, 506 and 508, extract acoustic features from audio components 500 and 502, respectively. A database 504 of speaker profile(s) stores speaker models characterizing the probability density distribution (pdf) of acoustic features from target speakers. By comparing the acoustic features extracted from acoustic feature extractor 506 and 508 and speaker profile(s), a speech mixer weight generator 510 generates two speech mixing weights, or two gains, for audio components 500 and 502 respectively, and modules 512 and 514 apply these two gains on audio components 500 and 502 accordingly. For each bin, a matrix mixer 516 mixes the weighted audio components using the inverse of the separation matrix of that bin. A delay estimator 518 estimates the time delay between the two remixed audio components, and delay lines 520 and 522 align the two remixed audio components. Finally, module 524 adds the two delay aligned remixed audio component to produce the single extracted speech signal 214, 314.

A speaker profile can be a parametric model depicting the pdf of acoustic features extracted from speech signal of a given speaker. Commonly used acoustic features are linear prediction cepstral coefficients (LPCC), perceptual linear prediction (PLP) cepstral coefficients, and Mel-frequency cepstral coefficients (MFCC). PLP cepstral coefficients and MFCC can be directly derived from a frequency domain signal representation, and thus they are preferred choices when a frequency domain BSS is used.

For each source component Y(n, m), a feature vector, say f(n, m), is extracted, and compared against one or multiple speaker profiles to generate a non negative score, say s(n, m). A higher score suggests a better match between feature f(n, m) and the considered speaker profile(s). As a common practice in speaker recognition, the feature vector here may contain information from the current frame and previous frames. One common set of features are the MFCC, delta-MFCC and delta-delta-MFCC.

Gaussian mixture model (GMM) is a widely used finite parametric mixture model for speaker recognition, and it can be used to evaluate the required score s(n, m). A universe background model (UBM) is created to depict the pdf of acoustic features from a target population. The target speaker profiles are modeled by the same GMM, but with their parameters adapted from the UBM. Typically, only means of the Gaussian components in UBM are allowed to be adapted. In this way, the speaker profiles in the database 504 comprise two sets of parameters: one set of parameters for the UBM containing the means, covariance matrices and component weights of Gaussian components in the UBM, and another set of parameters for the speaker profiles only containing the adapted means of GMMs.

With speaker profiles and the UBM, a logarithm likelihood ratio (LLR), $$r(n,m)=\log p[f(n,m)|\text{speaker profiles}]-\log p[f(n,m)|UBM] \quad \text{(Equation 3)}$$

is calculated. When multiple speaker profiles are used, likelihood p[f(n, m)|speaker profiles] should be understood as the sum of likelihood of f(n, m) on each speaker profile. This LLR is noisy, and an exponentially weighted moving average is used to calculate a smoother LLR as $$r_s(n,m)=ar_s(n,m)+(1-a)r(n,m), \quad \text{(Equation 4)}$$

where 0<a<1 is a forgetting factor.

A monotonically increasing mapping, e.g. an exponential function, is used to map a smoothed LLR to a non negative score s(n, m). Then for each source component, a speech mixing weight is generated as a normalized score as $$g(n,m)=s(n,m)/[s(1,m)+s(2,m)+\ldots+s(N,m)+s_0], \quad \text{(Equation 5)}$$

where $s_0$ is a proper positive offset such that g(n, m) approaches zero when all the scores are small enough to be negligible, and approaches one when s(n, m) is large enough. In this way, speech mixing weight for an audio component is positively correlated with the amount of desired speech signals it contains.

In the matrix mixer 516, the weighted audio components are mixed to generate N mixtures as $$[Z(1,k,m),Z(2,k,m),\ldots,Z(N,k,m)]=W^{-1}(k,m)[g(1,m)Y(1,k,m),g(2,m)Y(2,k,m),\ldots,g(N,m)Y(N,k,m)], \quad \text{(Equation 6)}$$

where $W^{-1}$(k, m) is the inverse of W(k, m).

Finally, a delay-and-sum procedure is used to combine mixtures Z(n, k, m) into the single extracted speech signal 214, 314. Since Z(n, k, m) is a frequency domain signal, generalized cross correlation (GCC) method is a convenient choice for delay estimation. A GCC method calculates the weighted cross correlation between two signals in the frequency domain, and searches for the delay in the time domain by converting frequency domain cross correlation coefficients into time domain cross correlation coefficients using inverse DFT. Phase transform (PHAT) is a popular choice of GCC implementation which only keeps the phase information for time domain cross correlation calculation. In the frequency domain, a delay operation corresponds to a phase shifting. Hence the extracted speech signal can be written as $$T(k,m)=\exp(jw_kd_1)Z(1,k,m)+\exp(jw_kd_2)Z(2,k,m)+\ldots+\exp(jw_kd_N)Z(N,k,m), \quad \text{(Equation 7)}$$

where j is the imaginary unit, $w_k$ is the radian frequency of the kth frequency bin, and $d_n$ is the delay compensation of the nth mixture. Note that only the relative delays among mixtures can be uniquely determined, and the mean delay can be an arbitrary value. One convention is to assume $d_1+d_2+\ldots+d_N=0$ to uniquely determine a set of delays.

The weighting and mixing procedure here can better keep the desired speech signal than a hard switching method. For example, considering a transient stage where the desired speaker is active and the BSS has not converged yet, the target speech signal is scattered in the audio components. A hard switching procedure inevitably distorts the desired speech signals by only selecting one audio component as the output. The present method as described combines all these audio components with weights positively correlated with the amount of desired speech signals in each audio component, and hence can well preserve the target speech signals.

Noise Mixer

FIG. 6 is a block diagram of the noise mixer 212B, 312B when two BSS outputs are weighted and mixed to generate an extracted noise signal. In FIG. 6, either noise profiles, or speaker profiles in the absence of noise profiles, stored in a database 600 and two BSS outputs, 500 and 502, are fed into a noise mixer weight generator 602 to generate two gains. Modules 604 and 606 apply these gains on the BSS outputs separately, and module 608 adds up the weighted BSS output to generate the extracted noise signal 216, 316. Ideally, the extracted noise signal 216, 316 should only includes the noise and interferences, block out any speech signal from the desired speakers.

When N microphones are adopted, and thus N source components are extracted, the noise mixer weight generator generates N weights, h(1, m), h(2, m), . . . , h(N, m). Simple weighting and additive mixing generates extracted noise signal E(k, m) as $$E(k,m)=h(1,m)Y(1,k,m)+h(1,m)Y(1,k,m)+ \ldots +h(N,m)Y(N,k,m). \quad \text{(Equation 8)}$$

When a noise GMM is available, the same method for speech mixer weight generation can be used to calculate the noise mixer weights by replacing the speaker profile GMM with the noise profile GMM. When a noise GMM is unavailable, a convenient choice is to use the minus LLR of (Equation 3) as the LLR of noise, and then follow the same procedure for speech mixer weight generation to calculate the noise mixer weights.

Post Processing

Figure 7:
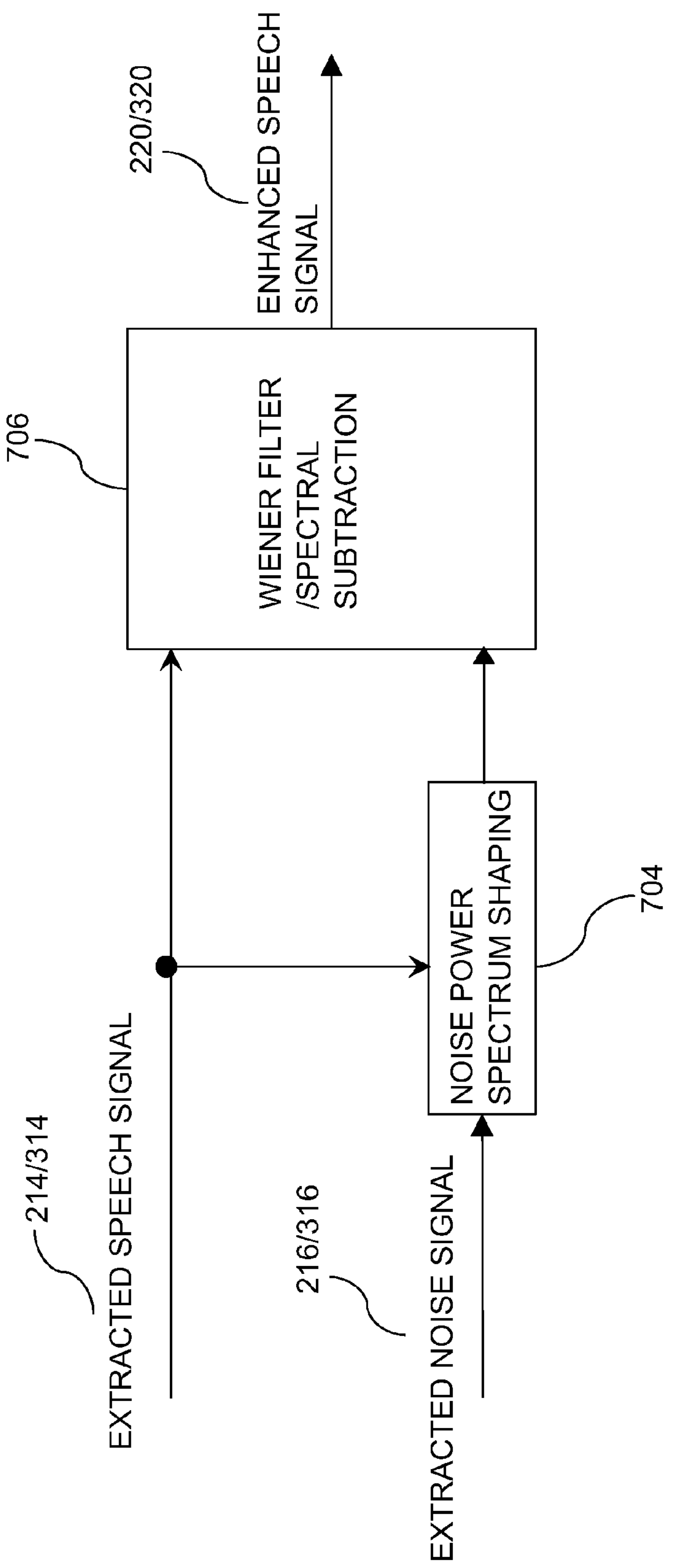
FIG. 7 is a flowchart illustrating a Wiener filter or spectral subtraction based post processing in accordance with the present invention.

FIG. 7 is a flowchart illustrating the post processing step as executing by the post processing module 218, 318. For each frequency bin, a Wiener filter, or a spectral subtraction, step 706 calculates a gain and applies it on the extracted speech signal 214, 314 to generate the enhanced speech signal 220. For each frequency bin, step 704 shapes the power spectrum of extracted noise signal 216, 316 to provide a noise level estimation for the use of the step 706.

A simple method to shape the noise spectrum is by applying a positive gain on the power spectrum of extracted noise signal as $b(k, m)|E(k, m)|^2$. The equalization coefficient b(k, m) can be estimated by matching the amplitudes between $b(k, m)|E(k, m)|^2$ and $|T(k, m)|^2$ during the periods that the desired speakers are inactive. For each bin, the equalization coefficient should be close to a constant in a static or slowly time varying acoustic environment. Hence, an exponentially weighted moving averaging method can be used to estimate the equalization coefficients.

Another simple method for determination of the equalization coefficient of a frequency bin is simply to assign a constant to it. This simple method is preferred if no aggressive noise suppression is required.

The enhanced speech signal 220, 320 is given by c(k, m) T(k, m), where c(k, m) is a non negative gain determined by the Wiener filtering or spectral subtraction. A simple spectral subtraction determines this gain as $$c(k,m)=\max[1-b(k,m)|E(k,m)|^2/|T(k,m)|^2,0]. \quad \text{(Equation 9)}$$

This simple method might be good for certain applications, like voice recognition, but may not be sufficient for other applications as it introduces watering sound. A Wiener filter using decision-directed approach can smooth out this gain fluctuations to suppress the watering noise to an inaudible level.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

What is claimed is:

1. A method for speech enhancement for at least one of a plurality of target speakers using at least two of a plurality of audio mixtures performing on a digital computer with executable programming code and data memories comprising steps of:

separating the at least two of a plurality of audio mixtures into a same number of audio components by using a blind source separation signal processor;

weighting and mixing the at least two of a plurality of audio components into an extracted speech signal, wherein a plurality of speech mixing weights are generated by comparing the audio components with target speaker profile(s);

weighting and mixing the at least two of a plurality of audio components into an extracted noise signal, wherein a plurality of noise mixing weights are generated by comparing the audio components with at least one of a plurality of noise profiles, or the target speaker profile(s) when no noise profile is provided; and enhancing the extracted speech signal with a Wiener filter by first shaping a power spectrum of said extracted noise signal via matching it to a power spectrum of said extracted speech signal, and then subtracting the shaped extracted noise power spectrum from the power spectrum of said extracted speech signal.

2. The method as claimed in claim 1 further comprising steps of transforming the at least two of a plurality of audio mixtures into a frequency domain representation, and separating the audio mixtures in the frequency domain with a demixing matrix for each frequency bin by an independent vector analysis module or a joint blind source separation module.

3. The method as claimed in claim 1 further comprising steps of generating the extracted speech signal by first weighting the audio components, then mixing the weighted audio components with the inverse of the demixing matrix of each frequency bin, then delaying the weighted and mixed audio components, and lastly summing the delayed, weighted and mixed audio components.

4. The method as claimed in claim 3 further comprising steps of extracting acoustic features from each audio components, providing at least one of a plurality of target speaker profiles parameterized with Gaussian mixture models (GMMs) modeling the probability density function of said acoustic features, calculating a logarithm likelihood for each audio component with the GMMs of speaker profile(s), smoothing the logarithm likelihood using an exponentially weighted moving average model, and mapping each smoothed logarithm likelihood to one of the speech mixing weights with a monotonically increasing function.

5. The method as claimed in claim 3 further comprising steps of estimating and tracking the delays among the weighted and mixed audio components using a generalized cross correlation delay estimator.

6. The method as claimed in claim 1 further comprising steps of generating the extracted noise signal by first weighting the audio components, and then adding the weighted audio components to generate the extracted noise signal.

7. The method as claimed in claim 6, wherein at least one of a plurality of noise profiles are provided, further comprising steps of extracting acoustic features from each audio component, calculating a logarithm likelihood for each audio component with Gaussian Mixture Models (GMMs) of the noise profile(s), smoothing each logarithm likelihood using an exponentially weighted moving average model, and transforming each smoothed logarithm likelihood to one of the noise mixing weights with a monotonically increasing function.

8. The method as claimed in claim 6, wherein no noise profile is provided, further comprising steps of extracting acoustic features from each audio component, calculating a logarithm likelihood for each audio component with Gaussian Mixture Models (GMMs) of speaker profile(s), smoothing the logarithm likelihood using an exponentially weighted moving average model, and transforming each smoothed logarithm likelihood to one of the noise mixing weights with a monotonically decreasing function.

9. The method as claimed in claim 1 further comprising steps of shaping the power spectrum of said extracted noise signal by approximately matching the power spectrum of said extracted noise signal to the power spectrum of said extracted speech signal during a noise dominating period, and enhancing the extracted speech signal with a Wiener filter by subtracting the shaped noise power spectrum from that of the extracted speech spectrum.

10. A system for speech enhancement for at least one of a plurality of target speakers using at least two of a plurality of audio recordings performing on a digital computer with executable programming code and data memories comprising:

a blind source separation (BSS) module separating at least two of a plurality of audio mixtures into a same number of audio components in a frequency domain with a demixing matrix for each frequency bin;

a speech mixer connecting to the BSS module and mixing the audio components into an extracted speech by weighting each audio component according to its relevance to target speaker profile(s), and mixing correspondingly weighted audio components;

a noise mixer connecting to the BSS module and mixing the audio components into an extracted noise signal by weighting each audio component according to its relevance to noise profiles, and mixing correspondingly weighted audio components;

a post processing module connecting to the speech and noise mixers and suppressing residual noise in said extracted speech signal using a Wiener filter with the extracted noise signal as a noise reference signal.

11. The system as claimed in claim 10, wherein the speech mixer comprises a speech mixer weight generator generating mixing weight for each audio component, a matrix mixer mixing the weighted audio component using an inverse of demixing matrix for each frequency bin, and a delay estimator estimating delays among the weighted and mixed audio components using a generalized cross correlation signal processor, and a delay-and-sum mixer aligning the weighted and mixed audio components and adding them to generate the extracted speech signal.

12. The system as claimed in claim 10, wherein the speech mixer further comprises an acoustic feature extractor extracting acoustic features from each audio component, a unit for calculating a logarithm likelihood of each audio component with at least one of a plurality of provided speaker profiles represented as parameters of Gaussian Mixture Models (GMMS) modelling the probability density function of said acoustic features, a unit for smoothing the logarithm likelihood using a weighted exponentially average model, and a unit transforming each smoothed logarithm likelihood to a speech mixing weight with a monotonically increasing mapping.

13. The system as claimed in claim 10, wherein the noise mixer further comprises a noise mixer weight generator generating a noise mixing weight for each audio component, and a weight-and-sum mixer weighting the audio components with the noise mixing weight and adding the weighted audio components to generate the extracted noise signal.

14. The system as claimed in claim 13, wherein the noise mixer comprises an acoustic feature extractor extracting acoustic features from each audio component, a unit for calculating a logarithm likelihood of each audio component, a unit for smoothing each logarithm likelihood using a weighted exponentially average model, and a unit for transforming each logarithm likelihood to the noise mixing weight with a monotonically increasing or decreasing function.

15. The system as claimed in claim 14, wherein at least one of a plurality of noise profiles are provided and are used to calculate the logarithm likelihood, and a monotonically increasing mapping is used to transform the smoothed logarithm likelihood to the noise mixing weight.

16. The system as claimed in claim 14, wherein no noise profile is provided, the target speaker profiles are used to calculate the logarithm likelihood, and a monotonically decreasing mapping is used to transform the smoothed logarithm likelihood to the noise mixing weight.

17. The system as claimed in claim 10, wherein the post processor comprises a module matching a power spectrum of said extracted noise signal to a power spectrum of the extracted speech signal during a noise dominating period, and the Wiener filter subtracts the matched noise power spectrum from that of the extracted speech signal to generate the enhanced speech signal spectrum.

* * * * *